(12) United States Patent
Drew et al.

(10) Patent No.: US 11,826,801 B2
(45) Date of Patent: Nov. 28, 2023

(54) SOIL REMEDIANT AND ITS METHOD OF PRODUCTION

(71) Applicant: Agri-Tech Organic Solutions Limited, Great Dunmow (GB)

(72) Inventors: Bruce Michael Drew, Great Dunmow (GB); Robert Anthony Severwright, Great Dunmow (GB); Robert Leslie Young, Great Dunmow (GB); Richard Curd, Great Dunmow (GB); Roger Benfield, Great Dunmow (GB)

(73) Assignee: Agri-Tech Organic Solutions Limited, Essex (GB)

( * ) Notice: Subject to any disclaimer, the term of this patent is extended or adjusted under 35 U.S.C. 154(b) by 275 days.

(21) Appl. No.: 16/961,279

(22) PCT Filed: Jan. 12, 2018

(86) PCT No.: PCT/GB2018/050079
§ 371 (c)(1),
(2) Date: Jul. 10, 2020

(87) PCT Pub. No.: WO2019/138205
PCT Pub. Date: Jul. 18, 2019

(65) Prior Publication Data
US 2021/0061727 A1   Mar. 4, 2021

(51) Int. Cl.
*B09B 3/00*   (2022.01)
*C05F 17/60*   (2020.01)
(Continued)

(52) U.S. Cl.
CPC .................. *B09B 3/00* (2013.01); *B09B 3/40* (2022.01); *C02F 11/02* (2013.01); *C02F 11/185* (2013.01);
(Continued)

(58) Field of Classification Search
CPC ... B09B 3/00; B09B 3/40; C02F 11/02; C02F 11/185; C02F 2209/02; C02F 2301/106;
(Continued)

(56) References Cited

U.S. PATENT DOCUMENTS

| 4,292,328 A | 9/1981 | Coulthard et al. |
| 6,299,774 B1 * | 10/2001 | Ainsworth ............. C12M 47/20 210/603 |

(Continued)

FOREIGN PATENT DOCUMENTS

| GB | 1522780 | 8/1978 |
| WO | 2001085627 | 11/2001 |

OTHER PUBLICATIONS

Risse, L. Mark, and Britt Faucette. Food waste composting: Institutional and industrial applications. University of Georgia, 2009. (Year: 2009).*

*Primary Examiner* — Jennifer A Smith
(74) *Attorney, Agent, or Firm* — Stephen T. Scherrer; Monique A. Morneault; Scherrer Patent & Trademark Law, P.C.

(57) ABSTRACT

There is disclosed a method of producing a soil remediant from liquid organic waste material in which the liquid organic waste material is concurrently pasteurised and digested by thermophilic aerobic digestion in the liquid phase in a single digester vessel. The organic waste material in the digester is maintained continuously at a temperature of at least 70° C. for at least an hour and the liquid organic waste material comprises at least 70% water and can be pumped. After a period of at least an hour a small amount of pasteurised organic waste material is removed and a corresponding amount of fresh organic waste material is added to the single digester vessel such that the temperature is maintained in a comfort zone of the thermophilic bacteria. In a preferred embodiment the thermophilic aerobic digestion (Continued)

Figure 1:
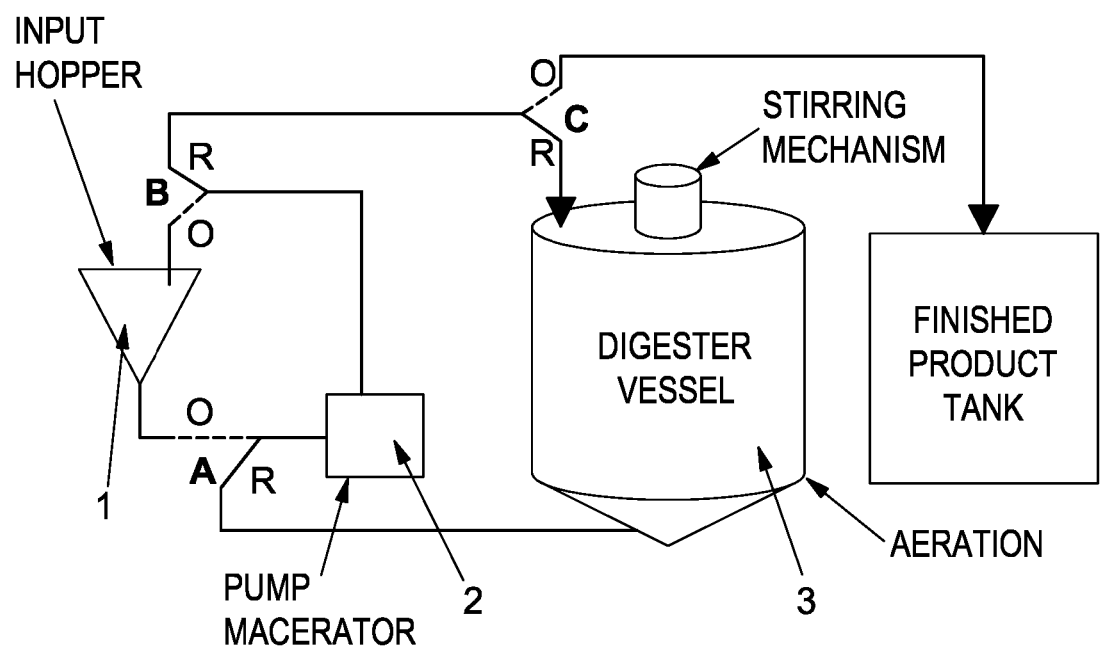

is facilitated by micro-organisms including crenarchaeota. The liquid organic waste material can be combined with a microporous adsorbent. Also disclosed is a soil remediant comprising a microporous adsorbent and liquid organic waste material from the novel method. The microporous adsorbent may be a volcaniclastic sedimentary rock or diatomite or of vegetable origin such as biochar. The microporous adsorbent may be a powder or a granular material and may have particle sizes up to 2000 microns.

14 Claims, 2 Drawing Sheets

(51) Int. Cl.
*C05F 17/70* (2020.01)
*C05F 17/40* (2020.01)
*C05F 17/80* (2020.01)
*C05F 17/10* (2020.01)
*C05F 17/993* (2020.01)
*C05F 17/971* (2020.01)
*C05G 5/12* (2020.01)
*C02F 11/02* (2006.01)
*C02F 11/18* (2006.01)
*C05G 3/00* (2020.01)
*B09B 3/40* (2022.01)

(52) U.S. Cl.
CPC .............. *C05F 17/10* (2020.01); *C05F 17/40* (2020.01); *C05F 17/60* (2020.01); *C05F 17/70* (2020.01); *C05F 17/80* (2020.01); *C05F 17/971* (2020.01); *C05F 17/993* (2020.01); *C05G 3/00* (2013.01); *C05G 5/12* (2020.02); *C02F 2209/02* (2013.01); *C02F 2301/106* (2013.01)

(58) Field of Classification Search
CPC .......... C05F 17/10; C05F 17/40; C05F 17/60; C05F 17/70; C05F 17/80; C05F 17/971; C05F 17/993; C05F 17/50; C05G 3/00; C05G 5/12; Y02P 20/145; Y02W 10/20; Y02W 30/40
See application file for complete search history.

(56) References Cited

U.S. PATENT DOCUMENTS

2012/0132586 A1   5/2012   Smith
2015/0315466 A1 * 11/2015  Morash .................. C09K 17/00
                                                    47/58.1 SC \* cited by examiner

SOIL REMEDIANT AND ITS METHOD OF PRODUCTION

This invention relates to a method of producing a soil remediant and to a soil remediant.

In the liquid phase, aerobic digestion has been practised for over a hundred years in sewage purification using activated sludge, promoted by bubbling compressed air through screened sewage. In the solid phase, aerobic digestion has been practised for even longer in composting vegetable material. Aeration is crucial to the rate of composting and can be effected by mechanical means or by means of in-vessel rotating drums.

The above examples exemplify different traditional ways of converting waste products into useful materials; in the case of the above examples, clean water and digested sewage sludge in the first case, and compost for increasing soil productivity in the second case.

An alternative use for vegetable waste has been to incorporate it into animal feed, particularly feed for chickens and pigs. Here again, the vegetable waste was put to good use.

Animal waste has traditionally been collected in what were called pig bins and also incorporated into animal feed, often as pigswill. This practice changed in 2001 when a serious outbreak of foot and mouth disease occurred in the United Kingdom. Concerns that the outbreak had started on a farm where pigs had been illegally fed unprocessed restaurant waste led to a nationwide ban in the UK on using waste from homes and catering outlets as animal feed. The UK ban was subsequently extended throughout the EU in 2003. The most efficient carrier of specific pathogens is, by far, the live pig. Pathogens of particular concern in the human food chain are *Escherichia coli, Streptococcus pneumoniae, Bordetella bronchiseptica, Clostridium piliforme* (2), and *Cryptosporidium* sp.

Subsequently, EU legislation was introduced relating to the digestion of animal and vegetable waste streams under conditions which satisfy the standard set out in 142/2011EC Annex V, Chapter III, Section 1. Regulation EC 142/2011 requires the treatment of particles no greater than 12 mm to at least 70° C. for 1 hour in a closed system, or alternatively to the standards set out in Annex V Chapter III Section 2, permitting alternative methods based on the demonstration of sufficient pathogen destruction. "Sufficient pathogen destruction" is often referred to as pasteurisation and the term "pasteurisation" will be used thus in this application. This legislation has encouraged the development of processes which meet the EU standard for pasteurising animal and vegetable waste materials.

Pasteurisation processes inevitably add cost to the digestion of animal and vegetable waste, which in turn impacts upon the cost of the pasteurised digestate. Whilst it is obligatory to meet the EU pasteurisation standard, there is inevitable pressure to meet it as economically as possible, which means firstly, using the least possible amount of external energy for heating during the pasteurisation process and secondly, attaining the highest possible rate of pasteurisation in order to operate the process at the greatest possible rate.

In parallel with the EU legislation for producing a digestate which is pathogen-free, agreements at successive world Governmental conferences have required a progressive reduction in the use of carbon-based fuels to generate energy, and a progressive overall reduction in the use of energy.

An object of the invention is to provide a method of treating animal and vegetable waste matter to produce a useful material. In particular it is an object of the invention to provide an improved method of producing a useful material. Another object is to provide a soil remediant and in particular an improved soil remediant.

According to an aspect of the invention there is provided a method of producing a soil remediant from liquid organic waste material in which the liquid organic waste material is pasteurised by thermophilic aerobic digestion in a single digester vessel.

According to a first aspect of the invention there is provided a method of producing soil remediant from organic waste material in a single digester vessel the method comprising:

1. introducing a predetermined amount of organic waste material to the single digester vessel in a liquid phase;
2. wherein the temperature of the organic waste material in the digester vessel is at or above 70° C.;
3. closing a circuit containing the single digester vessel for a period of time;
4. maintaining the organic waste material in the single digester vessel at a temperature of 70° C. or above for at least one hour such that the organic waste material is concurrently pasteurised and digested to a pre-determined extent, substantially without the need for external heat input;
5. after at least one hour withdrawing a first amount of pasteurised and digested organic waste material from the single digester vessel;
6. introducing a replacement second amount of organic waste material to the single digester vessel wherein the first amount and the second amount are substantially the same.

Preferably the first amount and the second amount are the same volume percent of the volume of the digester vessel. Preferably the first amount and the second amount are selected such that an efficiency of the thermophilic aerobic digestion is not inhibited. It will be appreciated that if too large an amount of replacement organic waste material is introduced, the temperature of the waste organic material will drop too far below 70° C. and the efficiency of digestion of the thermophilic bacteria will thereby be inhibited.

Desirably the temperature of the single vessel digester is 65° C. or higher immediately after addition of the second amount of replacement organic waste material. More preferably the temperature of the single vessel digester is 67° C. or higher immediately after addition of the second amount. Most preferably the temperature of the single vessel digester is 68° C. or higher immediately after adding the second amount of replacement organic waste material.

Keeping the temperature of the single vessel digester at 67° C. or higher immediately after the second amount is added maintains the temperature of the organic waste material in the single vessel digester in the comfort zone of thermophilic bacteria for efficient digestion of the organic waste material.

Desirably from 1 to 20% of the volume of the digester vessel is withdrawn and replaced. More preferably the amount is from 1-10% and most preferably from 1-5% of the volume of the digester.

In a preferred embodiment the first amount is about 3% of the volume of the digester.

It will be appreciated that the process of the present invention may thus be described as semi-continuous inasmuch as small quantities of pasteurised material are removed from the digester vessel "continuously" albeit at discrete intervals at least one hour apart. The method is semi-continuous in that the first amount of pasteurised and digested organic waste material is removed from the single digester vessel continuously after the period of time.

The period of time is at least one hour. Preferably the period of time is from one hour to six hours and more preferably from one hour to four hours or from one hour to three hours or from one hour to two hours. In a most preferred embodiment the period is about 1.5 hours.

Preferably the method further comprises combining the organic waste material with a microporous adsorbent. The microporous adsorbent will be described in more detail below.

Desirably the pasteurisation is a single stage process. In a preferred embodiment the pasteurisation occurs in a single step in the single digester vessel. The organic waste material is maintained in the digester at a temperature of at least 70° C. for at least one hour prior to being withdrawn It will be appreciated by the skilled person that pasteurisation and digestion are separate processes. For the purposes of clarity, the use of the term pasteurisation within this application is taken to mean compliance with EU Regulation EC 142/2011. The term "proper digestion" is taken to mean that bacteria have consumed at least 50% of the organic matter in the organic waste, converting it to carbon dioxide and water.

It will be appreciated that pasteurisation and proper digestion of the organic waste material are taking place independently of each other so that whilst the material within the single digester vessel may have been pasteurised, it may not have been properly digested, and vice versa.

As an illustration of the way in which the present invention can be practised under typical conditions within the single digester vessel, let it be assumed that:
  i. with the organic waste feedstock being provided, digestion of the organic waste would be complete in 3 days, and
  ii. pasteurisation is complete within an hour whilst the temperature is maintained no less than 70° C., and
  iii. we remove 3% of the digester vessel volume every hour, and
  iv. the contents of the digester vessel re-attain a temperature of 70° C. within an hour and a quarter of fresh feed being admitted to the digester vessel, so that pasteurisation is complete within two and a quarter hours of fresh feed being admitted, then, 3×24÷2.25=32% of the volume of the digester vessel would have been withdrawn as pasteurised product during each period of 24 hours, and the average residence time in the digester vessel of the withdrawn product would have been 67 hours, allowing a concurrence of "proper digestion" and "pasteurisation" to be provided.

The digester vessel may be insulated. Desirably the digester vessel and associated pipework are lagged in order to reduce heat loss. It is desirable that additional heating is not required to maintain the single digester vessel at a temperature in which concurrent pasteurisation and proper digestion occur. It will be appreciated that there may be a small drop in temperature of the waste organic material in the single digester vessel as the second amount of fresh organic material is introduced. However as the percentage volume is relatively small, the efficiency of the thermophilic bacteria is not greatly inhibited by the small drop in temperature and exothermic digestion of the organic waste material desirably raises the temperature of the contents of the single vessel digester back to at least 70° C. within an hour of introduction of the second amount of waste organic matter.

In some embodiments the digester may be maintained at a temperature of greater than 70° C. or greater than 75° C. In a preferred embodiment the temperature in the digester vessel is maintained at about 71.5° C. Most preferably the digester vessel is maintained at a temperature of 71.5° C.±1.5° C. It has been found that maintenance of the temperature at 71.5° C.±1.5° C. provides optimal conditions for the thermophilic organisms and allows them to thrive substantially eliminating the need for external heating of the digester vessel.

Preferably the liquid waste organic material comprises solid waste organic matter and a liquid. In a preferred embodiment organic waste matter is fed into an input hopper together with sufficient water to create a liquid feed or slurry. Desirably the liquid feed contains from 5% to 30% solid matter by weight and more preferably from 10% to 25% of solid matter. Most preferably the liquid feed contains from 10 to 20% solid matter. Preferably the liquid organic waste material comprises at least 70 wt % of water.

In a preferred embodiment the organic waste material liquid feed comprises from 70 to 90 wt % of water. In a more preferred embodiment the organic waste material liquid feed comprises from 80 to 90 wt % of water. The organic waste material may be considered to comprise organic waste matter suspended in liquid. The proportion of water in the organic waste material in the digester vessel is sufficiently high that the thermophilic digestion can be described as being "in the liquid phase" although it will be appreciated that the thermophilic organisms act on particles of solid matter suspended in the water.

The liquid feed is preferably macerated prior to entering the single digester vessel. The liquid feed may be macerated by a pump macerator as it is fed into the single digester vessel.

In preferred embodiments the liquid feed contains sufficient water to be—pumpable.

The solid waste organic matter may be derived from vegetable or animal waste products. The method provides a means of using waste animal matter and waste vegetable matter and producing a useful product.

The organic waste material may comprise animal and/or vegetable material derived from edible produce such as food waste from, for example, private households, hotels, restaurants, hospitals, residential homes or supermarkets. The organic waste material may also comprise animal manures, abattoir waste such as blood, contents of alimentary canal, or unpasteurised digestates such as those produced from anaerobic digestion.

In one embodiment a storage vessel can be inserted between the input hopper and the single digester vessel in order to add flexibility to the quantity and rate at which the organic waste is introduced into the single digester vessel. The organic waste material may be macerated prior to entry into the storage vessel. The inclusion of a storage vessel provides means to operate the system unattended and specifically overnight. The storage vessel is filled with prepared input waste during attended periods allowing fresh waste to be "continuously" fed to the single digester vessel during subsequent unattended periods, thereby maximising the throughput of waste.

In a preferred embodiment a controller is provided to ensure that the organic waste material is held at a temperature of at least 70° C. for at least one hour. Preferably the controller receives periodic temperature data from at least the single vessel digester. The controller may also receive temperature data relating to a temperature of the organic waste material before addition to the single vessel digester.

Desirably the controller also receives volume data relating to the first and second amounts. It is desired that the controller is arranged to output control signals to control valves to select the first and second amounts removed from and added to the single vessel digester. Preferably the controller has time data inputs. In a preferred embodiment the controller monitors the period of time for which the circuit containing the single vessel digester is closed. It is desirable that the controller is arranged to control the period of time. In a preferred embodiment the controller is arranged to utilise the temperature data to calculate the first and second amounts of organic waste material removed from and added to the single vessel digester. The controller may also be arranged to calculate the period of time based on the temperature and volume data inputs. The controller may have an algorithm to calculate the optimum period of time. Desirably the thermophilic aerobic digestion is automatically controlled by means of an algorithm which optimises the digestion. The algorithm preferably controls the first amount of pasteurised and digested organic material removed from the single digester vessel and the second amount of fresh organic waste material introduced into the single digester vessel and the period of time for which the circuit containing the single vessel digester is closed.

The liquidised feed is preferably fed into the digester vessel in replacement of pasteurised material that has been removed from the digester vessel, at strictly controlled times and in strictly controlled quantities in order to ensure that the contents of the digester vessel do not fall substantially below 70° C. and thereby disrupt the effectiveness of the thermophilic micro-organisms. Desirably the temperature in the single vessel digester remains above 67° C.

Desirably automatically controlled and monitored input and output valves reduce or eliminate any risk that unpasteurised material entering the digester vessel could contaminate pasteurised material before it is withdrawn from the digester vessel. Preferably pasteurised material is withdrawn from the digester vessel at a temperature of at least 70° C. before unpasteurised material is allowed to enter the digester vessel.

Preferably the quantity of pasteurised material being withdrawn and the equivalent quantity of unpasteurised material being allowed to enter are dependent upon the temperature of the unpasteurised material, since the temperature of the material in the digester vessel needs to be maintained substantially at or above 67° C. and preferably above 70° C. to preserve the effectiveness of the thermophilic micro-organisms despite the entry of unpasteurised material.

Preferably a small proportion of the pasteurised material is withdrawn at any one time. This may typically be from 1 to 20% of the volume of the digester vessel. More preferably the proportion is from 1-10% and most preferably from 1-5% of the volume of the digester. It will be appreciated that an equivalent volume of unpasteurised material is allowed to enter once the volume of pasteurised material has been withdrawn. At this point all of the material in the digester has to be held at a temperature of at least 70° C. for a further hour in order to be considered to be pasteurised. The process of the present invention may thus be described as semi-continuous inasmuch as small quantities of pasteurised material are removed from the digester vessel "continuously" albeit at discrete intervals at least one hour apart.

In one embodiment a heat exchanger may be provided to pre-heat unpasteurised material prior to entering the digester vessel. The heat exchanger may be arranged to be heated by pasteurised material being withdrawn from the digester vessel.

Desirably provision of a heat exchanger may enhance the quantity of pasteurised material being withdrawn at any one time. The optional use of a heat exchanger in such a way may provide a means to increase the quantity of pasteurised material that can be withdrawn from the digester vessel at any one time.

It will be appreciated that if the fresh organic waste is preheated, then a greater volume of the single digester vessel may be withdrawn and replaced. The controller is preferably arranged to calculate an appropriate period of time based on the temperature of the second amount of organic waste material and the temperature of the waste material in the single vessel digester.

Preferably control means and sensor means are provided and arranged to confirm and record by appropriate instrumentation and outputs that material withdrawn from the digester vessel complies with the EU pasteurisation standard, namely that it has been maintained at a temperature of at least 70° C. for at least one hour. Many analyses have demonstrated that the digestate provided by the present invention has been pasteurised and hence is free of pathogens, even after six months of storage at ambient temperatures.

The organic waste material may be digested by thermophilic organisms such as are well known in the art. In a preferred embodiment the thermophilic organisms may comprise one or more members of the kingdom of archaea. In a preferred embodiment the organisms may comprise crenarchaeota.

It has surprisingly been found that the soil remediant produced by the inventive method has unexpected advantages. Digestion by archaea may provide particular advantageous characteristics in the soil remediant. One hypothesis is that the archaea may facilitate the oxidation of ammonia to provide a nitrogen supply to plants in a form that is especially beneficial compared to other nitrogen sources.

Preferably oxygen is supplied to the waste organic material in the single vessel digester by bubbling air through the waste organic material. The oxygen may be provided by an aerating means. The aerating means may comprise one or more sparge tubes located in the digester vessel.

In some embodiments the organic waste material is agitated within the digester vessel. The agitation may be maintained by operation of at least one paddle. The or each paddle may be arranged to move the waste organic material in the vessel. The or each paddle may be arranged to move the waste organic material towards air bubbling from the or each sparge tube. Movement of the waste organic material towards the air bubbles increases contact of the waste organic material with the air bubbles so facilitating and accelerating aerobic digestion by the thermophilic micro-organisms. The oxygen supplied may assist in maintaining the temperature of the vessel in a desired temperature range that is supportive to proper digestion by thermophilic organisms and therefore effective in pasteurising the waste organic material.

In some embodiments a pump macerator may be provided. The pump macerator may be arranged to macerate waste organic material prior to entry to the digester vessel.

In other embodiments the pump macerator may be arranged to provide a dual purpose. It may circulate waste organic material from the digester vessel through the macerator at least a second or third time during the period of time in which the circuit containing the single digester vessel is closed. It may also macerate fresh organic material as it is drawn into the macerator after being immersed in digesting slurry that is provided within the input hopper in order to facilitate maceration prior to introduction into the single vessel digester. The circulating material in the closed circuit may be arranged to be within insulated pipes such that heat loss is minimised during circulation through the pipes and the pump macerator. The pump macerator may be arranged to be in continuous operation. In other embodiments the pump macerator may be arranged to operate sporadically. It has been found that sporadic operation is effective and minimises energy consumption. Where the pump macerator operates sporadically in order to minimise energy consumption, a temperature probe must be provided adjacent the macerator in order to ensure that the temperature of the circulating slurry does not fall below 70° C. and thereby invalidate pasteurisation. The temperature probe may be used to restart the pump macerator in order to ensure that pasteurisation is not invalidated.

The circulating pump macerator may be the same as the macerator used prior to entry of the organic waste material into the digester vessel.

Preferably the waste organic material is properly digested in a residence time of three days. More preferably waste organic material may be properly digested in a residence time of 60 hours.

In some embodiments it has been found that waste organic matter can be properly digested in as little as 48 hours. In a preferred embodiment the waste organic material may be properly digested in 36 to 40 hours.

In one embodiment the microporous adsorbent and the organic waste material are combined before pasteurisation by thermophilic aerobic digestion.

In another embodiment the microporous adsorbent is combined with the organic waste material after pasteurisation.

The microporous adsorbent may comprise mineral material. The microporous adsorbent may be a volcaniclastic sedimentary rock. The volcaniclastic sedimentary rock may comprise clinoptilolite, mordenite, phillipsite and/or chabazite. The microporous adsorbent may be diatomite. Alternatively the microporous adsorbent may be of vegetable origin such as biochar. In some embodiments the microporous adsorbent comprises a mixture of volcaniclastic sedimentary rock, diatomite and/or a material of vegetable origin such as biochar.

Preferably the microporous material is a powder or a granular material. In some embodiments the microporous material may have a particle size from 4 to 2000 microns. It is preferred that the granular material has a particle size of from 400 to 2000 microns (0.4-2.0 mm). In other embodiments the granular material has a particle size of from 400 to 1000 microns. Alternatively the microporous material may be a powder of particle size up to 700 microns (0.7 mm). In some embodiments the powder may have a particle size of up to 400 microns (0.4 mm). In other embodiments the powder may have a particle size of from 4 to 400 microns.

In some embodiments the microporous adsorbent may be added to the organic waste material prior to or during pasteurisation. Preferably in these embodiments, the microporous material is a powder having a particle size of up to 400 microns. It is desirable that the microporous material is held in suspension in the liquid waste organic material in the digester vessel. The proportion of microporous material to be added may be varied but it has been found that good results have been obtained when the microporous material is added at 10 wt % of the solid content of the organic waste matter.

In other embodiments the microporous adsorbent may be added to the organic waste material after pasteurisation has been carried out. Preferably the microporous material has a particle size of from 4 to 1000 microns. The proportion of microporous material added after pasteurisation may be varied according to the type of organic matter being digested and the ultimate use of the soil remediant. In some embodiments the microporous adsorbent is present in a proportion between 25% and 75%. The inclusion of a microporous adsorbent within the soil remediant may reduce the rate of leaching into ground water of nutritive components provided by the thermophilic aerobic digestion of the organic waste material. It has been found that adding the microporous adsorbent to the digestate in a ratio of from 1:3 to 3:1 by volume of the digestate slurry provides good agronomic results. In some embodiments the ratio may be from 1:1 to 3:1.

According to another aspect of the invention there is provided a soil remediant produced in accordance with the method of the first aspect of the invention.

According to a second aspect of the invention there is provided a soil remediant comprising a microporous adsorbent and a liquid organic waste material wherein the liquid organic waste material has been pasteurised by thermophilic aerobic digestion in the liquid phase in a single digester vessel in accordance with the first aspect of the invention.

According to a third aspect of the invention there is provided a system arranged for carrying out the method of the first aspect of the invention, the system comprising:
 i) an organic waste supply means supplying waste organic material to an inlet;
 ii) a means of mixing the organic waste with water;
 iii) a single vessel digester;
 iv) a macerator arranged to macerate the waste organic material at least before entry into the single vessel digester;
 v) a controller arranged to receive temperature data inputs from the waste organic material before entry to the single vessel digester and from the single vessel digester; volume data inputs; and time data and wherein the controller is arranged to control a circuit in which the single vessel digester is contained; a first amount of waste material removed from digester and a second amount of waste material introduced to the digester and a period of time during which the circuit containing the digester is closed;
 vi) the controller controlling the period of time and the first and second amounts in response to the temperature data to optimise thermophilic digestion of the waste organic material and to ensure concurrent pasteurisation of the waste organic material.

By creating a system and process conditions which are optimal for the development and the activity of thermophilic micro-organisms, the present invention complies with the EU pasteurisation standard whilst substantially avoiding the need for external heating, thereby addressing all of the above requirements of producing a product that is pasteurised and reducing or removing the need for external heating and so reducing energy consumption. It will be appreciated that the single vessel may be heated to raise the temperature to 70° C. to start the digestion method. However once the single vessel reaches 70° C. the method enables the concurrent pasteurisation and proper digestion to continue without external heating so providing a cost effective method that requires little or no external heating to be applied. Preferably no external heating is required.

Additionally, the present invention may be practised in a compact process which only requires a single digester vessel thereby reducing the cost of equipment.

In some embodiments the digester vessel may have an aerating means. The aerating means may be a sparge pipe provided in a lower part of the vessel. The supply of air may be provided by an air compressor. Alternatively, aerating means may be provided at reduced energy consumption by a venturi injector forcing slurry through a conical body thereby initiating a pressure differential between the inlet and outlet ports. This creates a vacuum inside the venturi injector body initiating air suction into the slurry through the suction port.

Optionally the digester vessel may be agitated by means of a paddle with blades encouraging a downward movement of the contents of the digester vessel thereby creating maximum contact with bubbles of air which rise through the contents from a sparge pipe which may be mounted horizontally below the paddle.

In the present invention, the design of the single digester vessel allows thermophilic micro-organisms to sustain the contents at a temperature of at least 70° C. providing "sufficient pathogen destruction" as defined in the EU legislation.

It has been found that the present invention enhances the rate of pasteurisation and hence the overall productivity of the digestion process by controlling the temperature variation in the digester vessel to 71.5° C.+/−1.5° C. and thereby providing optimal conditions for the thermophilic micro-organisms to digest the organic waste material. By controlling the temperature of the material in the digester vessel in this way and by regular replacement of pasteurised material with unpasteurised feed, the present invention has shown that the thermophilic micro-organisms are able to thrive and hence substantially eliminate the need for external heating of the digester vessel.

In some preferred embodiments the present invention comprises introducing packaging material. In some embodiments the packaging material is introduced with the organic waste material. Desirably in performance of the method the packaging material is properly digested within the residence time for proper digestion of the organic waste material.

In a preferred embodiment the packaging material is certified to comply with European norm EN13432. In some embodiments the packaging materials are polymeric.

Where the organic waste material is loaded into the input hopper in polymeric bags certified to comply with European norm EN13432 which requires at least 90% compostability within six months under conditions defined by the norm, it has surprisingly been found that such polymeric bags, after passage through the pump macerator along with their contents, can be completely digested by the present invention within a residence time of 48 hours. The proper digestion of other packaging materials, particularly filmic polymeric packaging materials which do not comply with EN13432, by use of the present invention is being investigated.

In some embodiments the soil remediant comprises a microporous adsorbent and organic waste material in the form of a pasteurised slurry.

In other embodiments the soil remediant is converted into a granular presentation following pasteurisation. The soil remediant may contain a binder in a proportion up to 20% in order to conserve the granular presentation following its manufacture. Preferably the binder is soluble in water.

According to another aspect of the invention a soil remediant is pasteurised by thermophilic aerobic digestion substantially without the use of external heat.

Figure 2:
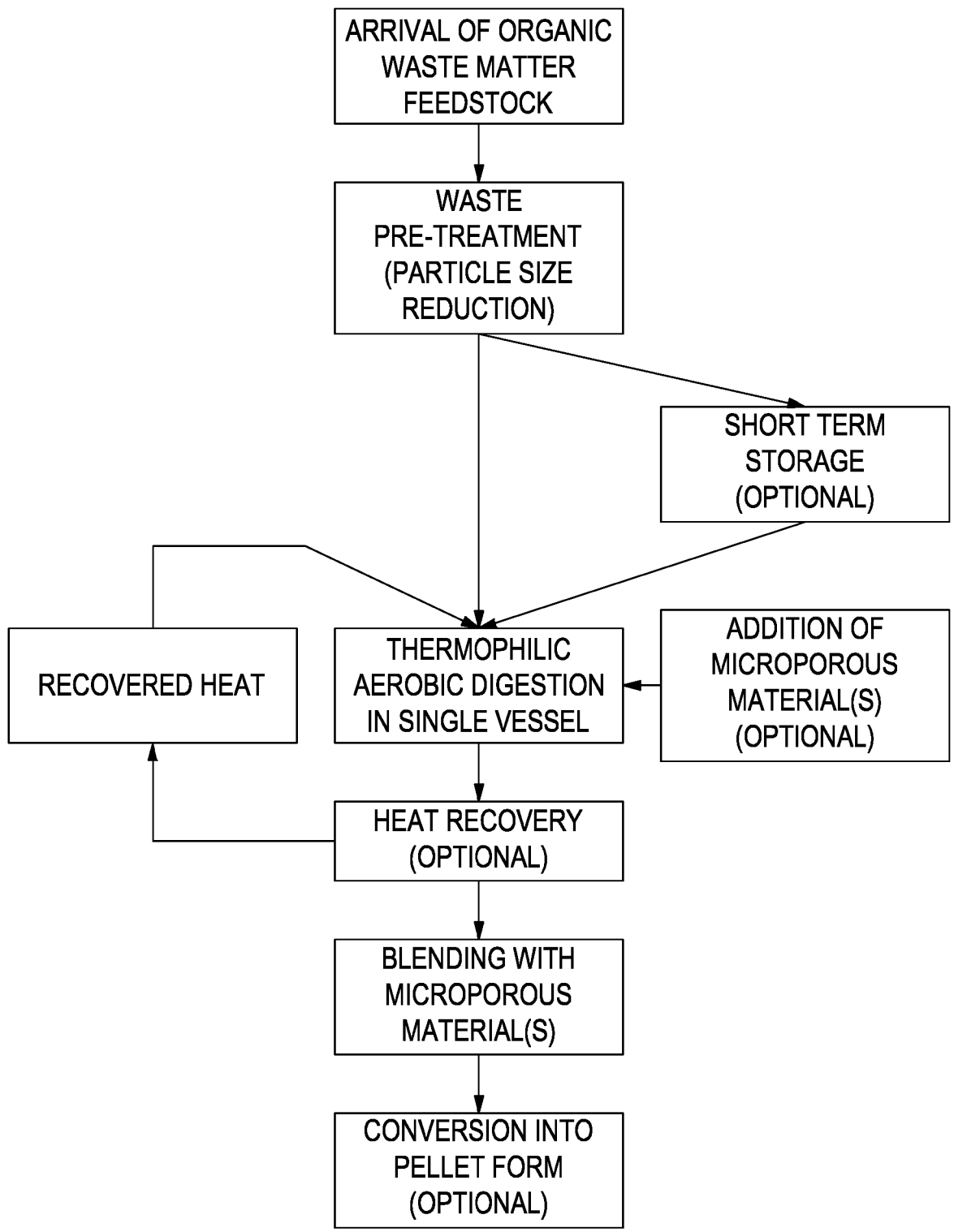

The process will now be described in detail with reference to the accompanying figures in which:

FIG. 1 is a schematic illustration of an arrangement for carrying out the method of the invention, and FIG. 2 is a scheme of the steps of the invention.

Organic waste material is fed into an input hopper 1 together with sufficient water and/or digesting slurry to create a liquid feed, typically containing between 10% and 30% of solid material and preferably of 10-20% solid material. The liquid feed is drawn by means of a pump macerator 2 into a single digester vessel 3. The organic waste material may comprise animal and/or vegetable material derived from edible produce such as food waste from, for example, private households, hotels, restaurants, hospitals, residential homes or supermarkets. However, the organic waste material may also comprise animal manures, abattoir waste such as blood, contents of alimentary canal, or unpasteurised digestates such as those produced by anaerobic digestion. Whatever the feedstock, it has proved possible to produce a pasteurised product not only complying with current EU regulations but also offering unexpected agronomic benefits when compared to the unprocessed feedstock or the product of other digestion processes.

In one embodiment the organic waste material liquid feed comprises from 80 to 90 wt % of water. The organic waste material can be considered to comprise organic waste matter suspended in liquid such that the proportion of water in the organic waste material in the digester vessel is sufficiently high that the digestion can be described as being carried out "in the liquid phase". It is thought that the thermophilic organisms act on particles of solid matter suspended in the water.

Optionally, a storage vessel can be inserted between the input hopper and the single digester vessel in order to add flexibility to the quantity and rate at which the organic waste is introduced into the single digester vessel. It will be appreciated however that the digestion and pasteurisation take part concurrently in the single digester vessel. The storage vessel is considered to be optional.

The liquidised feed is fed into the digester vessel at strictly controlled times and in strictly controlled quantities in order to ensure that the contents of the digester vessel always spend a period of time of at least one hour in the digester vessel at temperatures above 70° C. in order to comply with EU legislation and meet the requirements for pasteurisation.

By means of automatically controlled and monitored input and output valves, any risk that unpasteurised material entering the digester vessel could contaminate pasteurised material being withdrawn from the digester vessel is eliminated. The digester vessel is closed once a first amount of pasteurised organic waste material has been removed from the single digester vessel and a second amount of fresh organic material has been introduced into the single digester vessel. Pasteurised material is withdrawn from the digester vessel at a temperature of at least 70° C. before unpasteurised material is allowed to enter the digester vessel. The first amount and the second amount are the same percentage volume of the digester vessel. The quantity of pasteurised material being withdrawn and the equivalent quantity of unpasteurised material being allowed to enter are dependent upon the temperature of the unpasteurised material, since the temperature of the material in the digester vessel is desirably maintained at or above 67° C. and preferably above 70° C.

despite the entry of unpasteurised material. Typically a volume of up to 5% of the digester vessel is removed. An equivalent volume of fresh organic waste material is drawn into the digester. An exchange of up to 5% by volume of the organic waste material allows the temperature of the material to be maintained at or above 70° C. In a most preferred embodiment the first and the second amount are both 3% of the volume of the single digester vessel. It will be appreciated that once the fresh organic waste material has entered the digester the material must be maintained at a temperature of at least 70° C. for at least a further hour before any further digestate can be removed. In some cases the temperature may drop slightly below 70° C. immediately after the first amount of fresh organic waste material has been added to the single digester vessel. An additional period of time must elapse to allow the organic waste to regain an operating temperature of over 70° C. A period of more than one hour must elapse before a further removal and addition cycle can commence. Typically a period of 1.5 to 2 hours is allowed to elapse between removal and addition operations.

The process may thus be described as semi-continuous inasmuch as small quantities of pasteurised material are removed from the digester vessel "continuously" albeit at discrete intervals at least one hour apart.

One method of enhancing the quantity of pasteurised material being withdrawn is to install a heat exchanger by which unpasteurised material entering the digester vessel may be pre-heated by the pasteurised material being withdrawn from the digester vessel. The optional use of a heat exchanger in such a way provides a means to accelerate the rate at which the organic waste can be withdrawn from the digester vessel. It will be appreciated that if the unpasteurised material has been preheated then a shorter period of time is required to regain a temperature of 70° C. or more for pasteurisation purposes.

A control means is provided to monitor a temperature in the single digester vessel on a regular basis. The temperature may be monitored every 10 minutes or every 5 minutes or every 3 minutes or every minute or in some case more frequently than every minute.

The control means may also receive data inputs for the temperature of the first amount of unpasteurised organic waste material.

The control means may be arranged to control the first and second amounts. The first and second amounts may be varied in accordance with temperature data received by the control means.

The present invention is able to confirm and record by appropriate instrumentation that material withdrawn from the digester vessel complies with the EU pasteurisation standard, namely that it has been treated at a temperature of at least 70° C. for at least one hour. Many analyses have demonstrated that the digestate provided by the present invention is free of pathogens, even after six months of storage at ambient temperatures.

The digester vessel is agitated by means of a paddle with blades encouraging a downward movement of the contents of the digester vessel thereby creating maximum contact with bubbles of air which rise through the contents from a sparge pipe mounted horizontally below the paddle.

The digester vessel is lagged in order to reduce heat loss. In the present invention, the design of the single digester vessel allows thermophilic micro-organisms to sustain the contents at a temperature of at least 70° C. providing concurrently "sufficient pathogen destruction" as defined in the EU legislation and proper digestion.

It has been found that the present invention enhances the rate of pasteurisation and the overall productivity of the digestion process by controlling the temperature variation in the digester vessel to 71.5° C.+/−1.5° C. and thereby providing optimal conditions for the thermophilic micro-organisms to digest the organic waste material. By controlling the temperature of the material in the digester vessel in this way and by regular replacement of a second amount of pasteurised material with a first amount of unpasteurised feed, the present invention has shown that the thermophilic micro-organisms are able to thrive and hence substantially eliminate the need for external heating of the digester vessel. A reduction in the cost of digestion has thereby been achieved.

The organic waste material in the single digester vessel can be passed through a macerator to reduce a size of particles of organic waste material in the liquid phase. The organic waste material is supplied from a hopper and passes through a macerator before entering the single vessel digester. In some embodiments the macerator is arranged in a closed circuit with the single vessel digester. The organic waste material in the digester can be passed through the macerator in the closed circuit with the digester. The macerator and the pipes in the closed circuit are lagged and insulated in order to restrict heat loss from the organic waste material.

Where the organic waste material is loaded into the input hopper in polymeric bags certified to comply with European norm EN13432 which requires at least 90% compostability within six months under conditions defined by the norm, it has surprisingly been found that such polymeric bags, after passage through the pump macerator along with their contents, can be completely digested by the present invention within a residence time of 48 hours.

The process is illustrated schematically in FIG. 1.

During the circulation mode, valves A, B and C are in the relaxed position (R) with the pump macerator circulating digesting organic material either continuously or, in order to save electrical power and pump wear, sporadically.

During the discharging mode, the system operates valve C which moves to position (O). By this means, an amount of pasteurised product is transferred to the finished product tank, thereby creating space in the digester vessel for newly macerated organic waste. Once the transfer of pasteurised product has been completed, the system moves valve C back to the relaxed position (R).

During the filling mode, which begins as soon as the operator lifts the lid of the input hopper, the system operates valve B which moves to position (O) for a sufficient period of time, typically a few seconds, typically 20 seconds or less or 10 seconds or less, in the case of a 1000 litre digester vessel, in order to transfer material from the digester vessel into the hopper to flood the macerator. A level switch in the input hopper prevents over-filling, and the system operates valve A which moves to position (O) causing the material in the hopper to be circulated through the pump macerator. The operator now loads organic waste material into the input hopper. As soon as the level of organic waste material in the input hopper reaches a pre-determined level, the system operates valve B which moves to the relaxed position (R) allowing macerated material to be transferred to the digester vessel. Over-filling of the digester vessel is prevented by a high level alarm switching off electricity supply to the pump macerator. Once the available organic waste material has been loaded into the input hopper, or the high level alarm has inactivated the pump macerator, the operator closes the lid of the input hopper, signalling the end of the filling mode.

The system then operates valve A which moves to the relaxed position (R) and electricity supply to the pump macerator is re-established.

The system is now restored to the circulation mode with valves A, B and C all in the relaxed position (R). In the circulation mode the liquid organic waste material can be pumped by the macerator pump.

In a further aspect of the present invention, a microporous adsorbent is added to the digestate either to the digester vessel during pasteurisation, or to the pasteurised material after it has been withdrawn from the digester vessel. As examples which are by no means limiting, the microporous adsorbent may be mineral such as clinoptilolite, mordenite, phillipsite, chabazite, diatomite or mixtures thereof and/or vegetable such as biochar wherein the particle size of the microporous material is a powder of particle size up to 700 microns (0.7 mm), or a granular material of particle size between 400 and 2000 microns (0.4-2.0 mm).

When added to the digester vessel during pasteurisation, the microporous material is preferably a powder of particle size up to 400 microns (0.4 mm) in order that the majority of the microporous material may be held in suspension in the agitated digester vessel. The appropriate dosage of microporous material to be added during pasteurisation has been determined by experiment to lie between one half part and one and a half parts by weight of the solid content of the material being digested.

When added to the pasteurised material after it has been withdrawn from the digester vessel, the microporous material should preferably be a granular material of particle size between 400 and 2000 microns (0.4-2.0 mm). The relative quantities of microporous material and aerobically digested organic material will depend upon the type of organic material being aerobically digested, its solid content and the ultimate use of the soil remediant. Excellent agronomic results have been obtained where the dosage of microporous material added post-pasteurisation lies between one part and three parts by weight of the solid content of the digestate slurry.

The process is illustrated schematically in FIG. 2, although this illustration is by no means limiting as other variants of the process may be provided.

The present invention has demonstrated that the addition of an adsorbent microporous material provides unexpected synergistic benefits which have been demonstrated in trials by enhanced growth rates of crops planted in soil amended by the present invention. These unexpected benefits are beyond those obtained using digestate obtained by other aerobic, or indeed anaerobic, systems and leads to the conclusion that the aerobic digestion process of the present invention produces digestate containing plant nutritive micro-organisms including archea to a greater extent than that available from other digestion processes. The archaea, amongst other benefits, facilitate the oxidation of ammonia. Furthermore, it has been discovered that the absorbency of the microporous material encourages the retention during processing of the agronomically beneficial components of the thermophilic aerobic digestate. Once applied to the soil, the soil remediant is able to release the said agronomically beneficial components, allowing the plant to obtain maximum benefit therefrom. The absorbency of the microporous mineral is thereby able to reduce the rate at which the beneficial components of the aerobic digestate are leached from the soil into the water table.

Agronomic trials have proved conclusively that the addition of a microporous material to the digestate of the present invention, either during pasteurisation or post-pasteurisation, produces a soil remediant which provides great agronomic benefit. It has also been found that the addition of the same microporous material in the same proportions to organic waste digestates produced in the liquid phase by anaerobic digestion will provide a similar uplift in agronomic performance, whilst not attaining the same agronomic performance as those provided by the present invention.

The soil remediant is provided by thermophilic aerobic digestion comprising a microporous adsorbent and organic waste material wherein the thermophilic aerobic digestion takes place in the liquid phase in a single digester vessel. Where the adsorbent is mineral in origin, either a volcaniclastic sedimentary rock such as clinoptilolite, mordenite, phillipsite or chabazite, or a diatomite is preferred, although these are by no means limiting. Where the adsorbent is vegetable in origin, biochar is preferred. A mixture of the above adsorbents may also provide benefits in the agronomic performance of the soil remediant. The thermophilic aerobic digestion takes place in a single digester vessel in the liquid phase producing a soil remediant in the form of a slurry wherein the solid content is between 10% and 30%. The process is maintained at a temperature of between 70° C. and 75° C. and no product is removed from the single digester vessel until it has been resident in the digester vessel for at least one hour in order that the product may be considered pasteurised. In many examples of product that has been produced from different types of organic waste material according to the present invention, it has been surprisingly found that in a suitably lagged single digester vessel, no substantial use of externally provided heat has been necessary.

The digestate can be converted into a pelleted or granular presentation. In this aspect, it is important to retain the beneficial components contained within the liquid phase and hence the liquid digestate cannot be simply filtered and then pressed into a pellet presentation due to the loss of beneficial components present within the liquid phase. In this regard, the present invention differs significantly from the aerobic digestion utilised in the purification of screened sewage where the objective is to produce as clean a liquid effluent as possible. In the present invention, the objective is to produce a soil remediant of greatest efficacy from a feedstock of waste organic material wherein the composition can comprise widely variable materials. It will be noted that the liquid effluent from the present invention is rich in beneficial components of value in soil amendment which are preferably retained in any subsequent conversion of the liquid digestate into a granular product.

A traditional drying process is not only inappropriate on energy grounds but will also be inappropriate for retaining the beneficial components present in the liquid digestate.

In summary, the following advantages have been found for the present invention compared to alternative processes for the digestion of organic waste material:

1. Nutritional benefits as a soil remediant for plant growth and plant health, and in the case of pasteurised human food waste, nutritional benefits as a component of animal feed
2. Lower capital cost
3. Lower residence time
4. Elimination of unpleasant smells
5. A fully pasteurised product supporting by analytical evidence, even after the product has been stored at ambient temperature for six months.
6. A fully automated process providing recorded evidence of compliance with EU pasteurisation regulations.

The invention claimed is:

1. A semi-continuous method of producing soil remediant from organic waste material in a single digester vessel the method comprising:
   i. introducing a predetermined amount of liquid organic waste material to the single digester vessel wherein the liquid organic waste material comprises at least 70% water and can be pumped;
   ii. wherein the temperature of the liquid organic waste material in the digester vessel is at or above 70° C.;
   iii. closing a circuit containing the single digester vessel for a period of time;
   iv. maintaining the liquid organic waste material in the single digester vessel at a temperature of 70° C. or above for at least one hour such that the liquid organic waste material is concurrently pasteurised and digested through thermophilic aerobic digestion without the need for external heat input;
   v. after the at least one hour withdrawing a first amount of pasteurised and digested organic waste material from the single digester vessel wherein the first amount comprises from 1 to 20% of a volume of the digester vessel;
   vi. replacing the withdrawn first amount of pasteurized and digested organic waste material with a corresponding second amount of untreated liquid organic waste material to the single digester vessel wherein the second amount of untreated liquid organic waste material mixes with a remaining amount of pasteurised and digested organic waste material, and wherein a temperature of the liquid organic waste material within the single digester vessel does not fall below 65° C. immediately after addition of the second amount of untreated liquid organic waste material in order that efficient thermophilic digestion is maintained.

2. A semi-continuous method of producing a soil remediant in accordance with claim 1 wherein the method is semi-continuous in that the first amount of pasteurised and digested organic waste material is removed from the single digester vessel continuously after intervals of at least one hour and replaced by the corresponding second amount of untreated liquid organic waste material.

3. A semi-continuous method of producing a soil remediant in accordance with claim 1 wherein the first amount and the second amount are the same volume percent of the volume of the digester vessel.

4. A semi-continuous method of producing a soil remediant in accordance with claim 1 wherein the period of time during which the circuit is closed is from one hour to six hours.

5. A semi-continuous method of producing a soil remediant in accordance with claim 4 wherein a macerator is in the closed circuit with the single digester vessel and waste organic material passes through the macerator while the circuit is closed.

6. A semi-continuous method of producing a soil remediant in accordance with claim 1 in which the organic waste material passes through a macerator before entering the single digester vessel.

7. A semi-continuous method of producing a soil remediant in accordance with claim 1 wherein an aerating device is provided in the single digester vessel.

8. A semi-continuous method of producing a soil remediant in accordance with claim 1 wherein an agitation device is provided in the single digester vessel.

9. A semi-continuous method of producing a soil remediant according to claim 1 wherein thermophilic aerobic digestion is facilitated by micro-organisms.

10. A semi-continuous method of producing a soil remediant according to claim 1 wherein a control is arranged to control the first and second amounts in accordance with temperature data inputs.

11. A semi-continuous method of producing a soil remediant in accordance with claim 1 wherein digestion is achieved in three days or less.

12. A semi-continuous method of producing a soil remediant according to claim 1 wherein the liquid organic waste material is combined with a microporous adsorbent, wherein the microporous adsorbent is added to the liquid organic waste material before, during or after digestion and wherein the microporous adsorbent has a particle size of between 4 and 1000 microns.

13. A semi-continuous method of producing a soil remediant according to claim 1 wherein the method further comprises introducing packaging materials, wherein the packaging material is digested within a residence time for digestion of input waste wherein the packaging materials are certified to be biodegradable.

14. A semi-continuous method of producing a soil remediant in accordance with claim 1 wherein a heat exchanger is provided to pre-heat unpasteurized material entering the digester vessel using heat provided by the pasteurised material leaving the single digester vessel.

* * * * *